(12) United States Patent
Itoh (10) Patent No.: US 9,295,913 B2
(45) Date of Patent: **\*Mar. 29, 2016**

(54) INFORMATION PROCESSING DEVICES, INFORMATION PROCESSING METHOD, AND INFORMATION PROCESSING MEANS

(75) Inventor: Atsushi Itoh, Kanagawa (JP)

(73) Assignee: RICOH COMPANY, LTD., Tokyo (JP)

(\*) Notice: Subject to any disclaimer, the term of this patent is extended or adjusted under 35 U.S.C. 154(b) by 1237 days.

This patent is subject to a terminal disclaimer.

(21) Appl. No.: 12/135,272

(22) Filed: Jun. 9, 2008

(65) Prior Publication Data

US 2009/0005162 A1 Jan. 1, 2009

(30) Foreign Application Priority Data

Jun. 19, 2007 (JP) .................................. 2007-161786

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/20 | (2014.01) |
| A63F 13/40 | (2014.01) |
| A63F 13/30 | (2014.01) |

(52) U.S. Cl.
CPC .................. *A63F 13/06* (2013.01); *A63F 13/10* (2013.01); *A63F 13/12* (2013.01); *A63F 2300/1093* (2013.01); *A63F 2300/8029* (2013.01)

(58) Field of Classification Search
CPC .................................................. A63F 2300/695
USPC .................................. 463/9, 43; 382/177, 254
See application file for complete search history.

(56) References Cited

U.S. PATENT DOCUMENTS

| | | | | |
|---|---|---|---|---|
| 4,660,028 | A * | 4/1987 | Yu .................................. | 345/17 |
| 6,540,615 | B2 * | 4/2003 | Tanaka et al. ................... | 463/44 |
| 7,974,485 | B1 * | 7/2011 | Azar et al. ..................... | 382/254 |
| 2002/0137564 | A1 * | 9/2002 | Kawazu ......................... | 463/43 |
| 2003/0008713 | A1 * | 1/2003 | Ushiro et al. .................. | 463/42 |
| 2003/0137107 | A1 * | 7/2003 | Rubin ........................... | 273/292 |
| 2003/0223635 | A1 * | 12/2003 | Russon et al. ................ | 382/167 |
| 2003/0236111 | A1 * | 12/2003 | Otani et al. ........................ | 463/8 |
| 2006/0003843 | A1 * | 1/2006 | Kobayashi et al. .............. | 463/43 |

(Continued)

FOREIGN PATENT DOCUMENTS

| | | |
|---|---|---|
| JP | 05-030475 | 5/1993 |
| JP | 06-079061 | 3/1994 |

(Continued)

*Primary Examiner* — James S McClellan
*Assistant Examiner* — Syvila Weatherford
(74) *Attorney, Agent, or Firm* — IPUSA, PLLC (57) ABSTRACT

An information processing device configured to play a game based on battle parameters generated from pictures includes an input unit inputting a picture drawn by a user; a display unit displaying on a left or right side of a display area of the display unit the input picture drawn by the user by arranging the input picture input by the input unit; a picture reverse unit processing the picture input by the input unit by mirror-reversal of the input picture; a generating unit for generating battle parameters being used for the game using a feature value of the picture input by the input unit; and an executing unit executing the game based on the battle parameters generated by the generating unit, wherein the picture to be displayed on the left side of the display area of the display unit is processed by mirror-reversal by the picture reverse unit.

8 Claims, 8 Drawing Sheets

(56) References Cited

U.S. PATENT DOCUMENTS

2006/0281511 A1* 12/2006 Holm et al. .................. 463/9
2007/0018393 A1* 1/2007 Ritter et al. .................. 273/272
2007/0200855 A1* 8/2007 Minagawa .................... 345/474
2012/0069403 A1* 3/2012 Kurokawa .................... 358/1.18

FOREIGN PATENT DOCUMENTS

| JP | 07-323154 | 12/1995 |
|----|-----------|---------|
| JP | 2001-334021 | 12/2001 |

* cited by examiner

INFORMATION PROCESSING DEVICES, INFORMATION PROCESSING METHOD, AND INFORMATION PROCESSING MEANS

BACKGROUND OF THE INVENTION

1. Field of the Invention

The present invention relates to an information processing apparatus for playing an opponent type game, in which pictures of opposing characters appear on the left side and the right side of a display screen respectively.

2. Description of the Related Art

In patent document 1, a game apparatus is proposed that is named barcode battler.

The game apparatus provides an optical device to read a barcode having numerical data by an optical method, where the barcode is recorded on a card for a player. The game allows players of an offense side and a defense side to compete in the game based on win-loss results determined by numerical data.

As such an opponent type game converting external information on a barcode or the like into information (indicating a parameter of the fighting ability of the character) on the power of the offense and defense of a character chosen by a player according to a predetermined procedure, it has been recently proposed to use "TOC (Table of Contents) data of CD (Compact Disc)" in patent document 2, "remote control code of television or video sets" of patent document 3, and "information about a character, such as identification information and personality information on a character stored in a recording medium called a playing card" of patent document 4.

By using such external information instead of a barcode, it may be more enjoyable for a player to play a game.

However, the game devices shown in the documents 1-4 only use pre-existing external information, such as "TOC (Table of Contents) data of CD (Compact Disc)", "remote control code of television or video sets", and "information of a character, such as identification information and personality information of a character stored in a recording medium called a playing card", the information being converted into the battle parameters (indicating a parameter of the fighting ability of the character) of a character chosen by a player (user), so that creative activity of a player is limited to how to choose the external information of the predetermined characters and the pre-existing information.

For providing more creative activity than the opponent games shown in the patent documents 1-4, another opponent game allows utilizing a picture on a paper or the like drawn by a player (user), in which the feature of the character is used as battle parameters of the character.

Patent document 1 Japanese Examined Patent Application Publication No. 05-30475

Patent document 2 Japanese Patent Application Publication No. 06-79061

Patent document 3 Japanese Patent Application Publication No. 07-323154

Patent document 4 Japanese Patent Application Publication No. 2001-334021

However, for an "opponent type game that displays matching characters on a screen", the characters shown on the left side screen and the right side screen may not face each other in a front view of the display for a player, since characters have been drawn by players (users) with no limitation.

For example, it is reported by the Japan Cognitive Science Society about "drawing fishes" that a statistical result shows that approximately 80%-90% of the examinees draw their fishes heading to the left side ("left heading" fish was drawn).

It is known that people tend to draw left heading objects when they draw moving objects such as characters on a paper sheet. Therefore the drawn objects tend to be headed for the left side.

When applying the above result to characters drawn by players (users), it would be highly likely for two opponent characters drawn by players (users) to be heading to the left side on the game screen when opponent character pictures are displayed on the left area and the right area of the display region on the display screen.

As a result, the characters displayed may be shown to the players (users) on the left side and right side areas of the display region on the display screen with unnatural (inappropriate) heading directions, and the players (users) may be given an uncomfortable feeling.

By considering the above issue, the present invention may provide an information processing device, information processing method, an information processing program, and a recording medium on which an information processing program is recorded that can reduce the likelihood of opponent characters headed in unnatural directions for opponent type games that shows opponent characters on the display screen.

SUMMARY OF THE INVENTION

According to one aspect of the present invention, an information processing device is configured to play a game in which a win or loss is determined by applying a predetermined rule to battle parameters of each user generated from pictures drawn by the respective users, the information processing device including an input unit inputting a picture drawn by a user; a display unit displaying on a left or right side of a display area of the display unit the input picture drawn by the user; a picture reverse unit processing the picture input by the input unit by mirror-reversal of the input picture; a generating unit generating the battle parameters being used for the game using a feature value of the picture input by the input unit; and an executing unit executing the game based on the battle parameters generated by the generating unit, wherein the reversed picture processed by the picture reverse unit is displayed on the left side of the display area of the display unit.

According to the information processing device of the present invention, when the information processing device displays character pictures designed and input by the players (users) into the left area and right area of the display region on the display screen, the character picture to be displayed in the left area of the display region on the display screen is reversed left-to-right, so that the display direction of the character to be displayed in the left area is adjusted. The present invention may reduce the likelihood of displaying an opponent character in an inappropriate direction.

Thereby, the information processing device of the present invention may provide an opponent type game which a player (user) can enjoy on a computer without an uncomfortable feeling due to seeing an unnatural display of characters on the screen.

According to another aspect of the present invention, an information processing method may provide for playing a game in which a win or loss is determined by applying a predetermined rule to battle parameters of each user generated from pictures drawn by the respective users, the information processing method including an input step of inputting a picture drawn by a user; a display step of displaying on a left or right side of a display area of a display unit the input picture drawn by the user; a picture reverse step of processing the picture input by the input step by mirror-reversal of the input picture; a generating step of generating the battle parameters to be used for the game using a feature value of the picture input by the input step; and an executing step of executing the game based on the battle parameters generated by the generating step, wherein the reversed picture processed by the picture reverse step is displayed on the left side of the display area of the display unit.

According to the information processing method of the present invention, when the information processing device displays a character pictures designed and input by the players into the left area and right area of the display region on the display screen, the character picture to be displayed in the left area of the display region on the display screen is reversed left-to-right so that the display direction of the character to be displayed in the left area is adjusted. The information processing method of the present invention may reduce the likelihood of displaying an opponent character facing an inappropriate direction.

According to another aspect of the present invention, an information processing device for playing a game in which a win or loss is determined by applying a predetermined rule to battle parameters of each user generated from pictures drawn by the respective users, the information processing method including input means for inputting a picture drawn by a user; display means for displaying on a left or right side of a display area of the display unit the input picture drawn by the user; picture reverse means for processing the picture input by the input unit by mirror-reversal of the input picture; generating means for generating the battle parameters being used for the game using a feature value of the picture input by the input unit; and executing means for executing the game based on the battle parameters generated by the generating unit, wherein the reversed picture processed by the picture reverse means is displayed on the left side of the display area of the display unit.

According to the information processing means of the present invention, when the information processing device displays character pictures designed and input by the players (users) into the left area and right area of the display region on the display screen, the character picture to be displayed in the left area of the display region on the display screen is reversed left-to-right so that the display direction of the character to be displayed in the left area is adjusted.

Therefore, the information processing program of the present invention may provide an opponent type game which a player (user) can enjoy on a computer without an uncomfortable feeling due to seeing an unnatural display of a character on the screen.

According to an embodiment of the present invention, when the information processing device displays character pictures designed and input by the players (users) into the left area and right area of the display region on the display screen, the character picture being displayed in the left area of the display region on the display screen is reversed left-to-right so that the display direction of the character to be displayed in the left area is adjusted. The embodiment of the present invention may provide an information processing device, an information processing method, information processing means, an information processing program, and a recording medium on which the information processing program is recorded which enable reducing the likelihood of displaying an opponent character at an inappropriate direction.

Other objects, features and advantages of the present invention will become more apparent from the following detailed description when read in conjunction with the accompanying drawings.

DETAILED DESCRIPTION OF THE PREFERRED EMBODIMENTS

By referring to the accompanying drawings, preferred embodiments of the present invention are described in the following.
First Embodiment
<Configuration of Hardware of the Information Processing Device>

Figure 1:
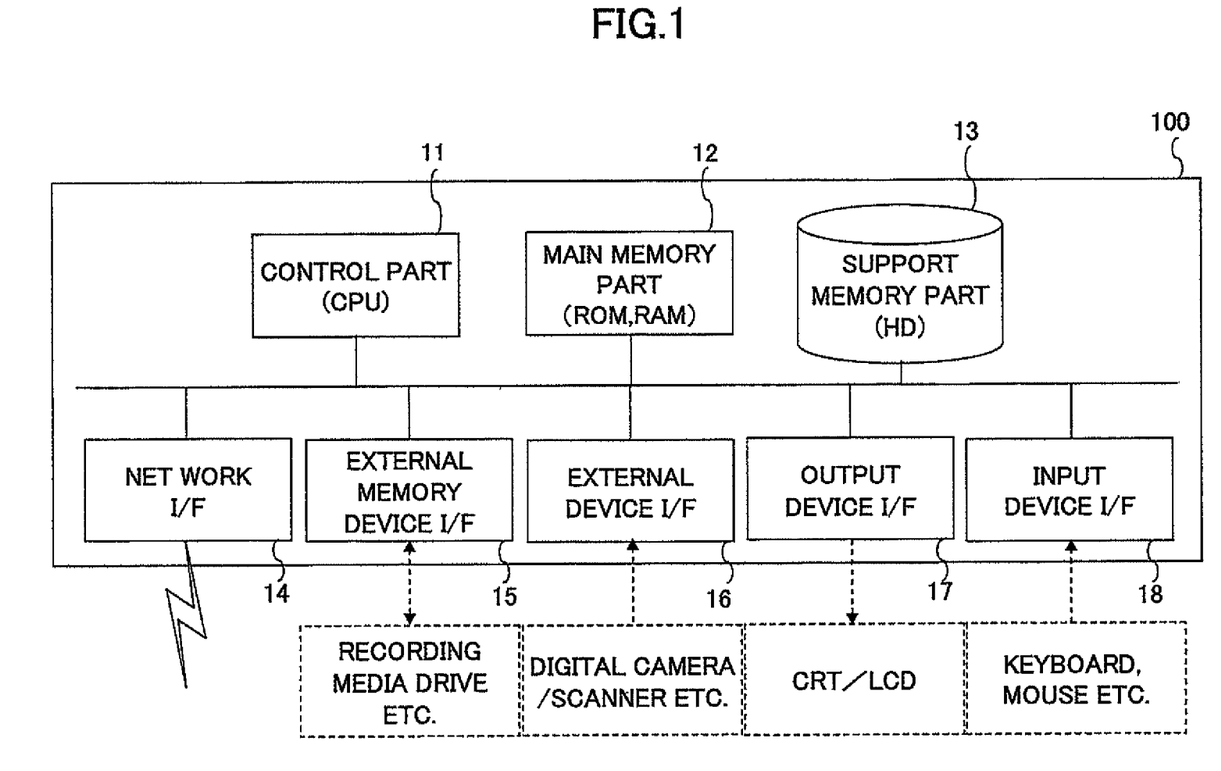
FIG. 1 shows an example of a hardware configuration of the information processing device related to the first embodiment of the present invention.

A hardware configuration of an information processing device of an embodiment is shown in FIG. 1.

FIG. 1 is an illustration showing an example of a hardware configuration of an information processing device 100 of an embodiment of the present invention.

As shown in FIG. 1, the information processing device 100 of the embodiment includes a control part 11, a main memory part 12, a storage part 13, a network I/F 14, an external storage device I/F 15, an external device I/F 16, an output device I/F 17, and an input device 18.

A CPU (Central Processing Unit) of the control part 11 is a processing device configured to execute a program loaded into a RAM (Random Access Memory) of the main memory part 12. For example, the control part 11 controls the whole information processing device 100 by executing and processing a program of fundamental software (OS: Operating System) stored in the storage part 13.

A ROM (Read Only Memory) and a RAM Random Access Memory) of the main memory part 12 are memory devices to retain or temporarily store a program to be executed by the control part 11 and related data. The ROM stores a group of programs for controlling peripheral devices connected to the information processing device 100, and programs stored in the ROM are loaded into the RAM and are executed by the control part 11 when the power of the information processing device 100 is turned on.

The support memory part 13 includes a non-volatile storage device such as a hard disk (HD) or the like. An OS or application software (e.g. an information processing program related to an embodiment of the present invention) or the like is installed in the support memory part 13 with related data and stored in a predetermined area of the memory. The support memory part 13 stores individual information items to be used by the information processing device 100, in which the information is managed by a data base (DB) or a file system (FS).

The network I/F 14 is an interface between peripheral devices (e.g. other information processing devices and the like) having information functions for connecting to a network (data information network) such as a LAN based on data transmission lines configured by wired/wireless lines, or a WAN (Wide Area Network) and the information processing device 100.

The external memory device I/F 15 is an interface between an external memory device (e.g. memory media device and the like) connected to data transmission lines via a USB (Universal Serial Bus) or the like and the information processing device 100. For example, when a memory media drive is connected to the external memory device I/F 15 via a USB cable, the information processing device 100 may install application software stored in the storage media drive by reading the application software from the connected storage media drive.

The external device I/F 16 is an interface between an external device connected to such as a USB through data transmission lines (e.g. an external HD, a USB memory, a digital camera and a scanner, etc.) and the information processing device 100. For example, when the external device I/F 16 is connected to a scanner via a USB cable, the information processing device 100 may receive picture data as input data read by the scanner.

The information processing device 100 related to the present embodiment may communicate each type of data (send-receive or reading/writing) with external devices through the interfaces.

The output device I/F 17 is an interface between an output device (such as a CRT (Cathode Ray Tube), LCD (Liquid Crystal Display), etc.) connected through specific cables or data transmission lines and the information processing device 100.

The input device I/F 18 is an interface between an input device (such as a keyboard, a mouse, etc.) connected through transmission lines and the information processing device 100.

The information processing device 100 related to the present embodiment may provide functions of user-interface and information-providing.

Further, as described in the following, the information processing device 100 related to the present embodiment may provide "an opponent type game showing the opponent characters on a screen", in which a program stored in the ROM of the main memory part 12 or a memory device of the support memory 13 may be loaded into the RAM of the main memory part 12 so that the program is executed by the control part 11.

Related to a Configuration of Main Functions of the Information Processing Device Further, a configuration of "a function of an opponent type game" related to an embodiment of the present invention, provided by the configuration of hardware in the information processing device 100 described in FIG. 1, is described by referring to FIGS. 2-6.

Figure 2:
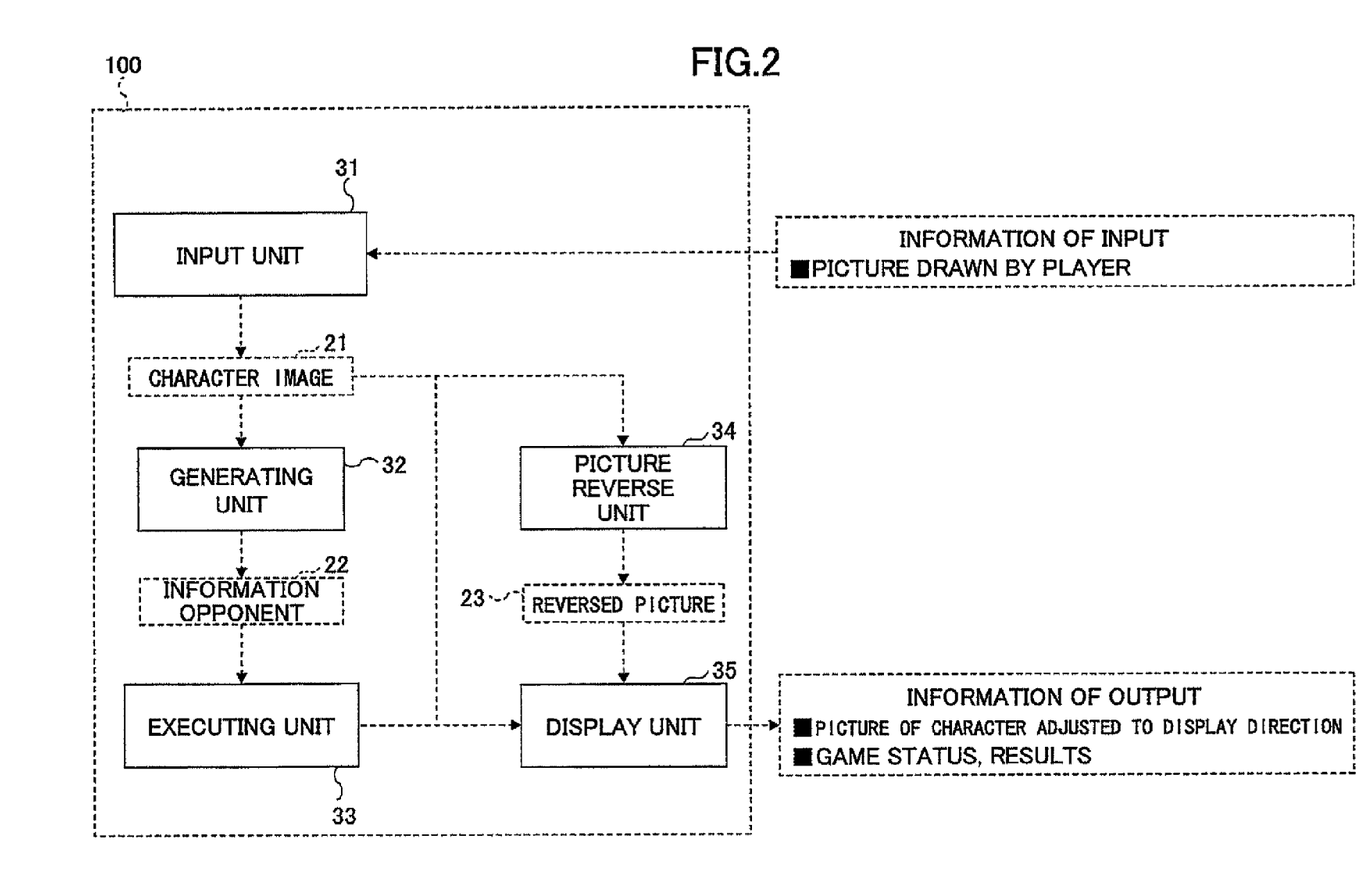
FIG. 2 shows an example of a configuration of the main functions included in the information processing device related to the first embodiment of the present invention.

FIG. 2 is a schematic illustration of an information processing device 100 related to the first embodiment of the present invention, showing an example of a main configuration of the functions.

In FIG. 2, it is shown by an example that the "function of an opponent type game" of the information processing device 100 related to the present embodiment is provided with individual devices mainly performing "an input function that inputs a drawing designed (drawn) by a player (user) as picture data", "a generation function that generates battle parameters (indicating a parameter of the character's fighting ability) to be used for the game using an amount of the feature of the input picture", "an execution function that executes a game according to the generated battle parameters (indicating a parameter of the character's fighting ability), and "a display function that displays characters to be used for the opponent game according to the input picture."

The function of the information processing device 100 related to the present embodiment includes an input unit 31, a generating unit 32, an executing unit 33, a picture reversing unit 34, and a display unit 35.

The input unit 31 inputs a drawing designed (drawn) by a player (user) as picture data (named as "input picture" in the following).

Figure 3:
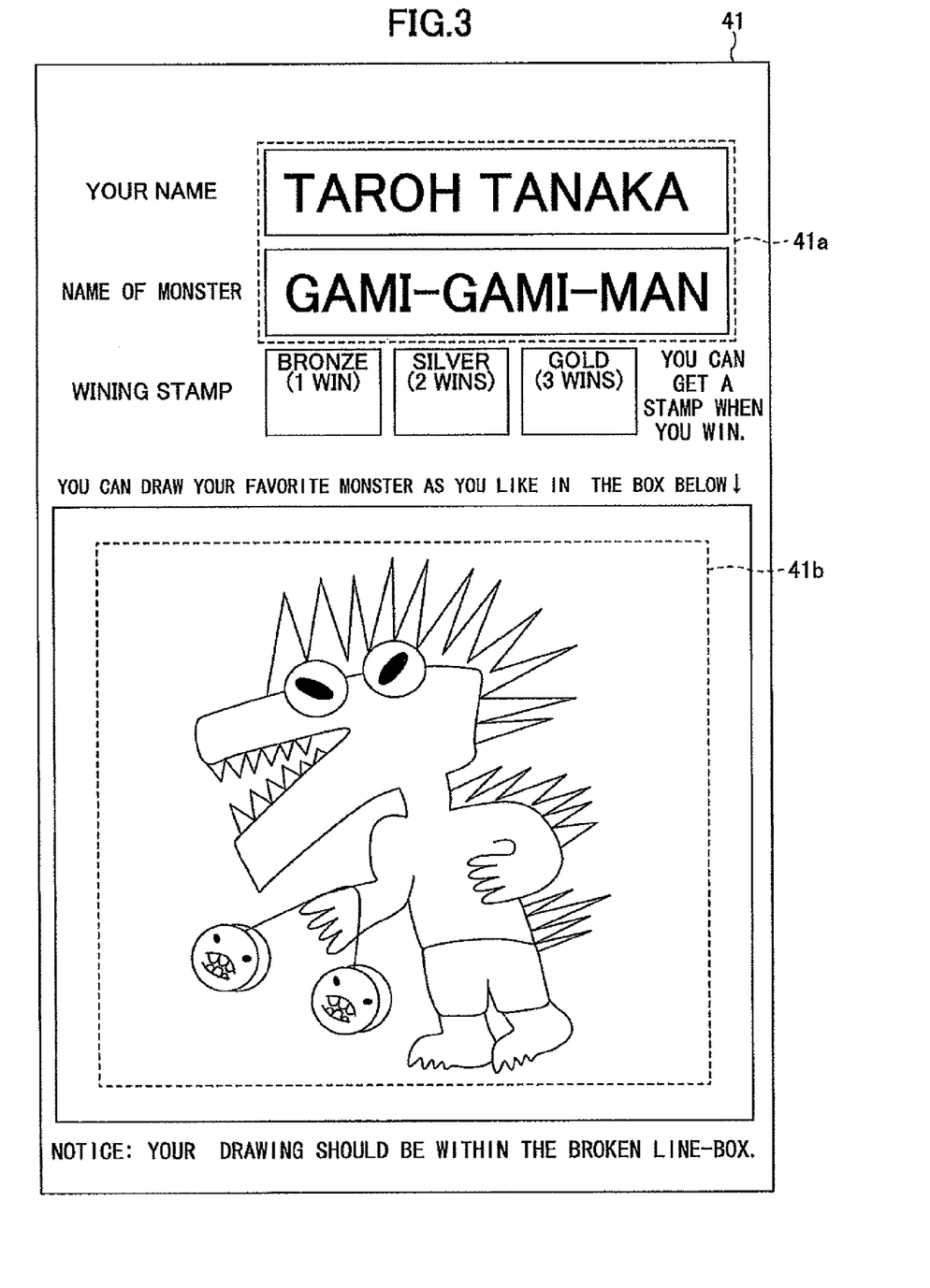
FIG. 3 is an illustration showing an example of a character drawn by a user related to the first embodiment of the present invention.

FIG. 3 is an illustration showing a fighting character drawn by a user as an example of the first embodiment of the present invention.

The player (user) may design (draw) a character in a drawing area 41*b* of an image generating medium 41, and the information related to the character such as the player's (user's) name and a character's name may be written in an information area 41*a*, as shown in FIG. 3.

FIG. 3 shows an example where a character named "GAMI-GAMI-MAN" is drawn by a player (user) named 'TAROH TANAKA.'

Thereby, the player (user) by himself may generate a character to use for playing a game with his opponent player (another user), which may provide a user with enjoyment before the game.

The image generating medium 41 above includes media that make possible messages such as "readable and writable by humans" and "reading information drawn/written by humans using an image reading device or the like." Therefore, according to the present embodiment, it is possible to use paper, electronic paper, and rewritable paper as media for writing information on the drawing of a character and information of the character. In the following description of the present embodiment, for example, "a paper" is used as the image generating medium.

As shown in FIG. 3, the input unit 31 may scan a picture of a character designed (drawn) by a player (user) by using a scanner for inputting an image connected to the external device I/F 16 of the information processing device 100 of the present embodiment, extract images from predetermined rectangular areas indicated as the information area 41*a* and the drawing area 41*b* shown in FIG. 3, and input them into the generating unit 32, which is described below.

Further, the information processing device 100 may input a drawing 41 drawn by using a touch panel as picture data.

The input unit 31 may input the text information of a name of a player (user) and a character's name extracted from a character image 21 (named as a character image in the following) of the information area 41*a* in FIG. 3 into the RAM of the main memory part 12 by using an OCR (Optical Character Reader) function of a scanner or the like.

Further, by using the control part 11, the input unit 31 performs data processing described above and stores the character image 21 shown in the drawing area 41*b* of FIG. 3 into the RAM of the main memory part 12.

Next, the generating unit 32 generates battle parameters 22 (indicating a character's fighting ability) used for games by using a feature value of the character image 21 extracted with the input unit 31.

The generating unit 32 generates the battle parameters 22 (indicating a character's fighting ability) according to the following procedure.

(Generating Procedure A) Extraction of Predetermined Bit Number

The generating unit 32 repeatedly extracts data (predetermined bit line) per predetermined number of bits from the character image 21 stored by the input unit 31 in the RAM of the main memory part 12.

For example, the generating unit 32 sequentially (repeatedly) extracts eight-bit data (eight-bit line) from the character image 21 when a predetermined number of bits is set equal to eight bits (1 byte).

(Generating Procedure B) Classifying Extracted Data and Calculating a Frequency in Extracting Data The generating unit 32 classifies the extracted (eight-bit line) data (named "extracted data" in the following) into type of the battle parameters 22 according to a predetermined classification rule.

For example, the battle parameters 22 of the present embodiment includes three parameters (numerical values), that is, "physical strength (parameter 1)", "attack power (parameter 2)", and "defense power (parameter 3)."

In the present embodiment, the "classification rule" may classify extracted data (eight-bit line) into three types of parameters of the battle parameters 22, and data regions may be assigned to respective parameters of the extracted data.

In the generating procedure A, for example, when data are extracted by an eight-bit (one byte) unit, a data region (00~FF) of two digits of hexadecimal numbers may be classified into three data regions, such as data area of 00~6F as "physical strength (parameter 1)", 70~9F as "attack power (parameter 2)", and A0~FF as "defense power (parameter 3)." The classification rule classifies the data regions into three types of parameters of the battle parameters 22. The information of these data regions may be stored into a nonvolatile storage device such as a support memory part 13.

In FIG. 2, the generating unit 32 classifies the extracted data (eight-bit line) to predetermined data regions according to the classification rule.

For example, when extract data are [01101100], the eight-digit binary number is converted to a two-digit hexadecimal number [6C]. Thus, extract data [01101100] is assigned to 00~6F hexadecimal data region as a "physical strength (parameter 1)." Further, when extracted data (eight-bit line) indicate [00110100], they are converted to [34], and then these data [00110100] are classified into a "physical strength (parameter 1)."

When classifying extracted data the generating unit 32 calculates a number (a frequency in extraction) of data to be extracted by the type of the battle parameters 22.

In the example above, the extract data, being assigned to "physical strength (parameter 1)" of battle parameters 22, is extracted twice as [00110100] and [00110100].

In the present embodiment, the number of extractions (frequency in extraction), obtained with the generating procedure A and generating procedure B, may vary according to the bit pattern of picture data and the varied number may be defined as "a feature value" of a character image 21.

The generating unit 32 may process data by using the control part 11, and may store the generated (calculated) "feature value" of the character image 21 into RAM of the main memory part 12.

Thereby, the information processing device 100 of the present embodiment may generate a "feature value" of the character image (picture) 21 from the extracted bit patterns of the character image 21. Further, as the battle parameters 22 may be generated from the "feature value" according to a generating procedure C and a generating procedure D, which will be described below, it does not need to depend on the format of the character image 21 (JPEG: Joint Photographic Experts Group or PNG: Portable Network Graphics) extracted by the player (user), and it is possible to generate the battle parameters 22 (indicating character's fighting parameter) such as "physical strength (parameter 1)", "attack power (parameter 2)", and "defense power (parameter 3)" for use in the game.

(Generating Sequence C) Elimination of a Numerical Error Included in a Feature Value (Calculation of a Rounded Feature Value)

The generating unit 32 may round a numerical error of "feature value" of a character image 21, in which the error is included when the character image 21 is read by using a scanner and generated (calculated) through the generating sequences A and B.

The numerical error may be eliminated (calculation of a rounded feature value) by using an equation below.

$$\text{A rounded feature value} = \text{int}(\text{a feature value}/100) \quad (1)$$

where "int(X)" indicates a function to calculate an integer from a given number X.

A "feature value" indicates an extracting number (frequency) of data for a predetermined bit number for the type of parameters of the battle parameters 22 (indicating character's fighting ability).

The "numerical error" above may indicate an error (a small number of fluctuations) caused by the sequences through which a picture on a paper is scanned (read) plural times with a scanner or the like, so the error may be generated between the plural times picture data are obtained by the scanner or the like. Also, the error may be caused by individual characteristics of the scanner or the like, depending on individual scanners or the like.

For taking account of data fluctuations of "feature value" generated (calculated) by the generating unit A and generating unit B, the generating unit 32 may transform (round) numerical data of "feature value" by which the last two digits of the numerical data are eliminated as described in the equation 1, and thereby the transformed numerical data may not be affected by data fluctuations.

For example, when a "feature value" of a character image (picture) 21, classified as "physical power (parameter 1)" of the battle parameters 22, is [24732], a rounded feature value (=int(24732/100)) may become [247] by using the equation 1.

Thereby, the information processing device 100 may reduce data fluctuation of parameters in the battle parameters 22 due to numerical errors caused by reading picture data.

(Generating Procedure D) Generation of Battle Parameters 22 by Random Number Generation and Normalization The generating unit 32 may generate random numbers by utilizing the rounded "feature value" of the character image 21 with the generating procedure C as a seed.

At this point, a generated random number may have a range between 0 and 1. The generating unit 32 may normalize the generated random number (a number ranging between 0 and 1) according to the equation 2 below and calculate each parameters of the battle parameters 22 (indicating character's fighting ability).

$$\text{Parameter number} = \text{int}(\text{random number} \times 100) \quad (2)$$

"int(X)" indicates a function that generates an integer from a number X.

A "random number" indicates an extraction number (extraction frequency) of "feature value" of the character image (picture) 21, which is rounded for a type of the battle parameters 22 (indicating character's fighting ability).

For example, when a random number is [0.3419256 . . . ], which is generated based on a seed of a rounded feature value [247] of the character image 21 classified as "physical strength (parameter 1)" of the battle parameters 22, the "physical strength" parameter (=int(0.3419256 . . . ) of the battle parameters 22 is calculated to be [34] according to equation 2.

The present embodiment uses a normalized number calculated from a random number, which is generated based on a rounded feature value obtained with the generating procedure D, as respective parameters ("physical strength", "attack power", and "defense power") of the battle parameters 22 (indicating character's fighting ability).

The generating unit 32 performs data processing by using the control part 11 as described above, and stores individual parameters ("physical strength", "attack power", and "defense power") of the battle parameters 22 (indicating character's fighting ability) into RAM of the main memory part 12.

Thereby, the information processing device 100 of the present embodiment may generate the battle parameters 22 (indicating character's fighting ability) using the "feature value" of an extracted character image (picture) 21 by performing the generating procedures A through D.

Further, the information processing device 100 of the present embodiment may provide an interesting opponent type game in which a player (user) may apply his own creativity, because the player (user) would not be able to anticipate the result of the game by using the battle parameters 22 (indicating character's fighting ability) generated from a random number that is created with the "feature value" of an extracted character image 21.

At this point a player (user) is ready to start an opponent type game by inputting a character designed (drawn) by the user himself as a picture (picture data or image data) and use the feature value of the picture as the battle parameters.

In FIG. 2, the executing unit 33 executes a game based on the player's (user's) battle parameters 22 (indicating character's fighting ability) generated with the generating unit 32.

The executing unit 33 executes a game based on the battle parameters 22 (indicating character's fighting ability) according to the following procedure.

(Executing Procedure A) Determining the First Move Player (User) and the Second Move Player (User)

The executing unit 33 determines the first move player (user) by using a random number.

(Executing Procedure B) Attack (Calculating Actual Attack Power) by the First Move Player's (User's) Fighting Character The executing unit 33 calculates an actual attack power (=P2×α) by multiplying the parameter P2 of the "attack power" of the player's (user's) fighting character and a random number α.

(Executing Procedure C) Defense (Calculating Actual Defense Power) by the Second Move Player's (User's) Fighting Character The executing unit 33 calculates actual defense power (=P3×β) by multiplying the "defense power" parameter P3 of the second move player's (user's) fighting character and a random number β.

(Executing Procedure D) Update Battle Parameters 22 (Updating "Physical Strength" Parameter)

The Executing Unit 33 Calculates a subtraction ((P2×α)−(P3×β)) between the actual attack power (=P2×α) of the first move player's (user's) fighting character and the actual defense power (=P3×β) of the second move player's (user's) fighting character.

Further, the executing unit 33 performs a subtraction (=P1−((P2×α)−(P3×β))) between the "physical strength" parameter P1 of the second move player's (user's) fighting character and the number ((P2×α)−(P3×β)) obtained from the above sequence.

The executing unit 33 updates the "physical strength" parameter P1 of the second move player's (user's) fighting character with the number of (=P1−((P2×α)−(P3×β))) obtained by the above subtraction.

Next, the executing unit 33 switches to the attack side of the second move player (user) and the defense side of the first move player (user), and performs the executing procedures B through D again.

Thereby, the executing unit 33 performs the executing procedure B through the executing procedure D) with taking turns with the attack side and the defense side. When one player's "physical strength" parameter P1 becomes zero or less than zero, then the player loses the game, and the game is over.

In the above example, the executing procedures assume that the number of the players (users) is two. Further, when there are over three players, for example, the game may be performed by a predetermined rule such as that the right side player's (user's) fighting character is attacked.

The executing unit 33 performs the above data processing with the control part 11.

The visual effects of the opponent type game executed by the executing unit 33 may be seen on a display screen 51 shown in FIG. 4 with a display unit 35, which will be described below.

Figure 4:
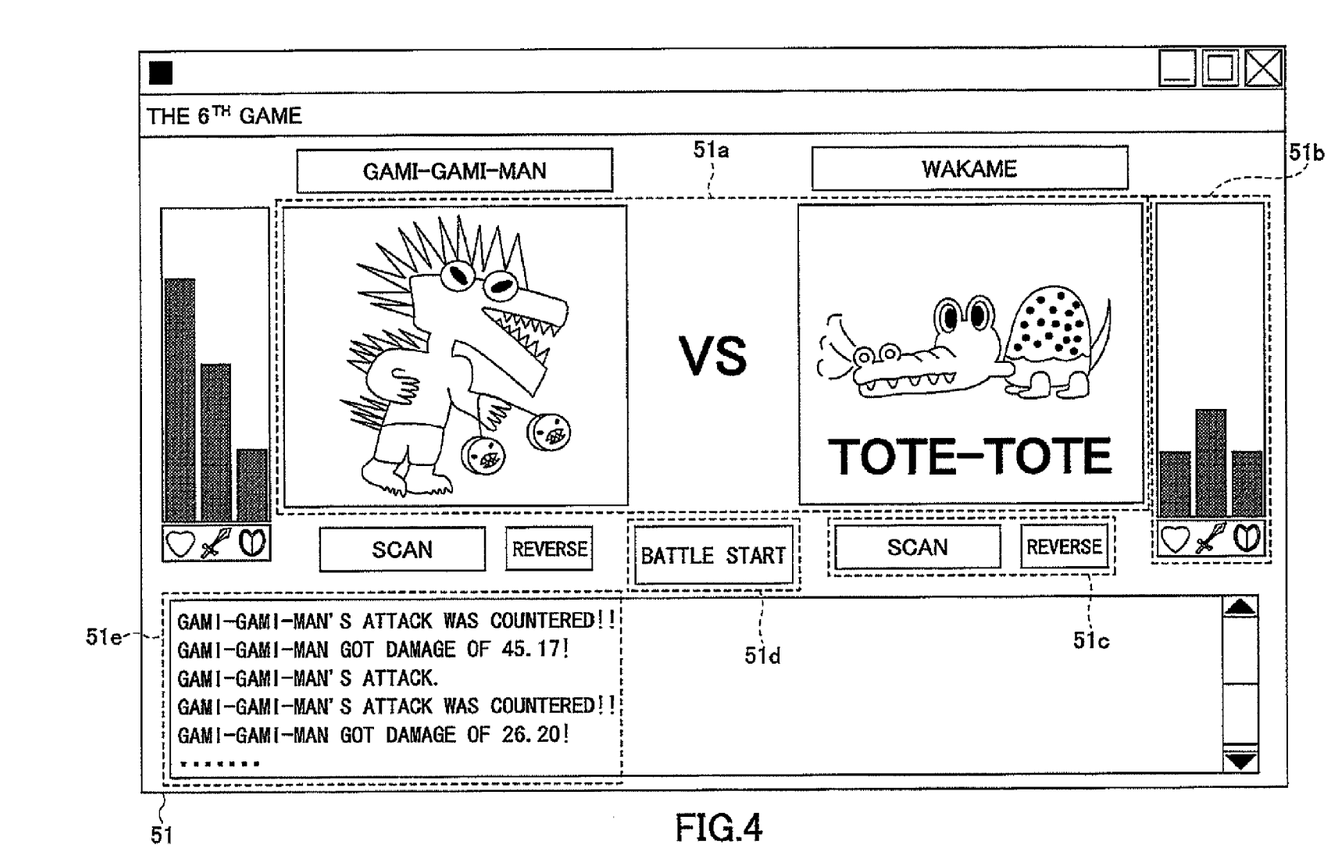
FIG. 4 is an illustration showing an example of a display screen while executing a game related to the first embodiment of the present invention.

FIG. 4 shows an example of a display screen 51 while a game being executed according to the embodiment 1 of the present invention.

Figure 5:
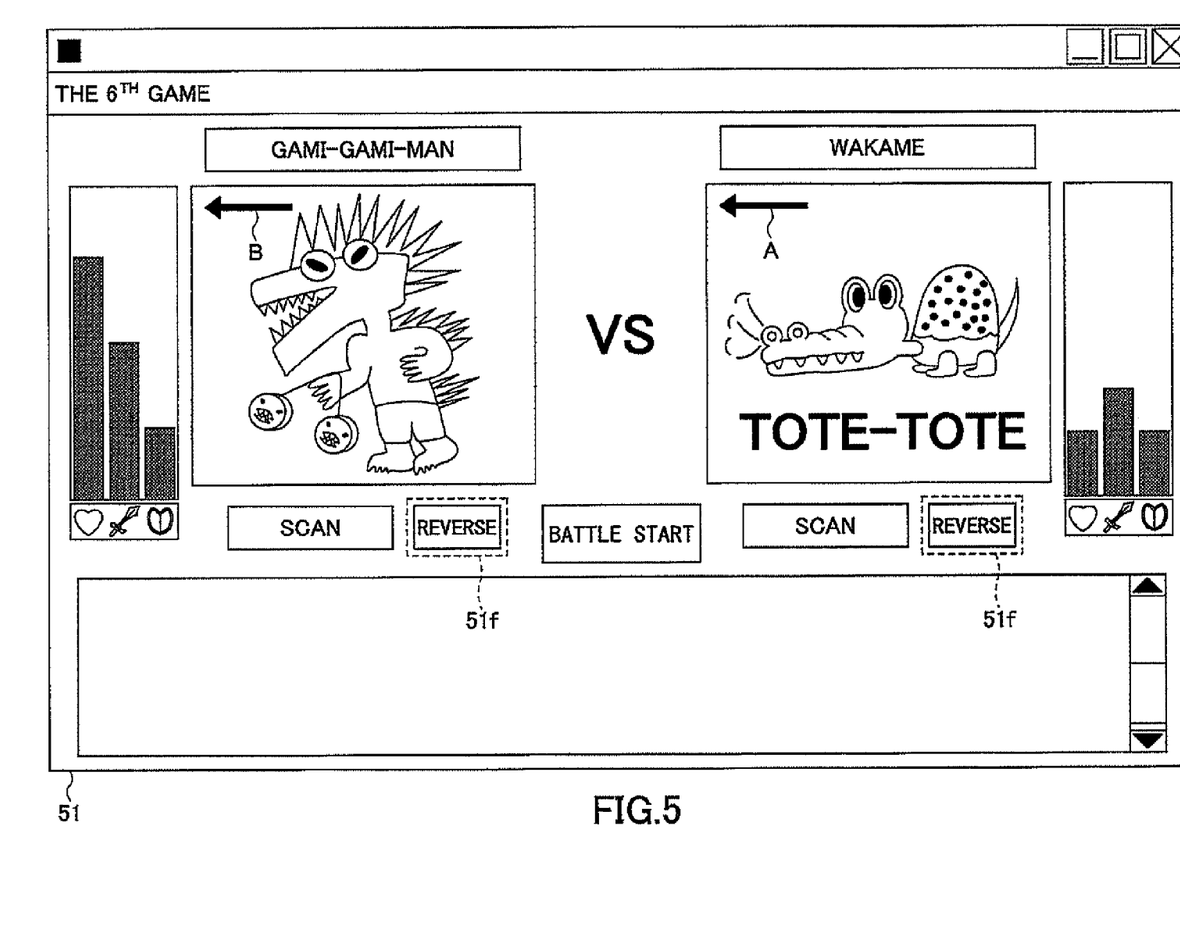
FIG. 5 is an illustration showing an example (case 1) of a display screen before starting a game related to the first embodiment of the present invention.

The information processing device 100 related to the present embodiment may display a display screen 51 showing a user interface (UI) indicating the game operation with a display unit 35 such as a CRT or a LCD as an output device, which is connected via the output device I/F 17 as shown in FIG. 5.

The display unit 35 displays the character image 21 of the opponent characters assigned to the left side and the right side of the display region facing each other on the display screen 51.

The display screen 51 may include a screen area 51a showing character images 21 extracted by the input unit 31 on left and right sides of the screen, a screen area 51b graphically indicating individual parameters ("physical strength", "attack power", and "defense power") of the battle parameters 22 of the players (users), button 51c indicating operation of the character image 21, enabling side-reversing (inversing) the character image 21 read by the input unit 31 or on the screen, a button 51d instructing start of the opponent game (executing a game), and a screen area 51e for showing the game status, game result and the like.

The present embodiment may display the character image 21 (stored in RAM of the main memory part 12) in the screen area 51a, where a player (user) sets a character designed (drawn) on paper on a scanner, puts the pointer in the display screen 51 with a mouse, a pointing device or the like on the [SCAN] button, then instructs (clicking the mouse's button when using a mouse) the scanner to scan. When the player (user) wants to reverse (inverse) left and right sides of the character image 21 shown in the screen 51, the player (user) selects the [REVERSE] button and image processing called mirroring is performed so that the character image 21 is reversed. Further, as well as the character image 21, the character name (text data stored in RAM of the main part 12) is shown in the screen area 51*a* of the display screen 51.

Further, when the player (user) is ready, the attack side of the player (user) selects the [BATTLE START] button 51*d* to start the game.

As a result, plural players (users) may play the opponent game between them performed by the executing unit 33 using the battle parameters 22 (indicating a parameter of the character's fighting ability), and the game status and the game result are displayed in the screen area 51*e* with the display unit 35.

FIG. 4 shows an example of a battle between characters named "GAMI-GAMI-MAN" and "WAKAME."

In FIG. 4, "GAMI-GAMI-MAN" shown in the left side and "WAKAME" in the right side in the screen area 51*a* of the display screen 51 are in positions facing each other.

On the other hand, "GAMI-GAMI-MAN" shown in FIG. 3 heads for the left, and when the character image 21 of "GAMI-GAMI-MAN" input by the input unit 31 is assigned in the left side of the screen area 51*a*, it is displayed in as FIG. 5.

FIG. 5 shows an example (case 1) of a display screen before starting the game related to the first embodiment of the present invention.

FIG. 5 indicates an example of a display screen on the display screen 51 shown by the display unit 35 after a player (user) is ready (the input unit 31 and the generating unit 32 have performed).

As shown as an arrow A and an arrow B in the figure, when the character images 21 extracted by the input unit 31 are displayed in the same direction (the left side in the figure), the player (user) needs to select the [REVERSE] button 51*f* for reversing the character image 21 from facing the left side to facing the right side. Especially, as a character designed (drawn) by the player (user) tends to head for the left side, it is highly likely (see the statistics of Japan Cognitive Science Society) that a player (user) will need to reverse the character image 21 that is assigned in the left side region for which the character images 21 extracted by the input unit 31 are assigned to the display region in the display screen 51.

Thus, the present embodiment reverses a character image 21 to be assigned in the left region of the display region on the display screen before displaying the character images 21 extracted by the input unit 31, where the picture reversing unit 34, working when the [REVERSE] button 51*f* is selected, reverses the character image 21 facing the left side to face the right side automatically.

The picture reversing unit 34 determines whether the character image 21 extracted by the input unit 31 is displayed facing the left side of the display region in the display screen 51 according to a predetermined rule, and if necessary the character image 21 is reversed facing the left side to facing the right side and the reversed character picture 23 is sent to the display unit 35.

For example, as a "predetermined rule", the picture reversing unit 34 reverses left and right directions of the first character image 21 by a mirroring process and generates a reverse picture 23 when two character images 21 would have been extracted by the input unit 31 and the first character image 21 would be set in the left side in the display area of the display screen 51.

The information processing device 100 predicts the heading direction of a character designed (drawn) by a player (user), and adjusts the display (heading) direction of a character image 21 extracted by the input unit 31 during preliminary processing for displaying in the display screen 51.

Figure 6:
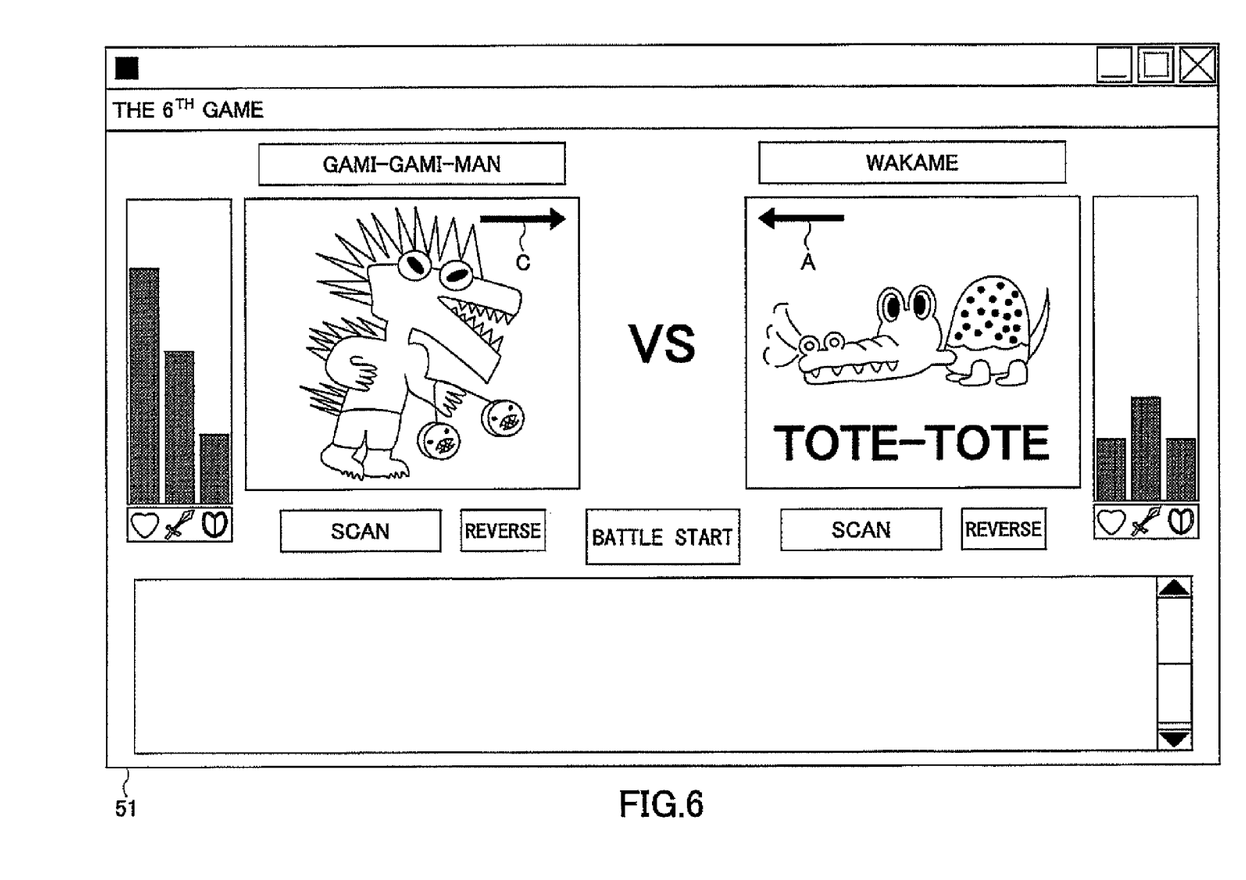
FIG. 6 is an illustration showing an example (case 2) of a display screen before starting a game related to the first embodiment of the present invention.

As a result, the present embodiment may provide that opponent characters have appropriate positions (heading directions), with the characters facing each other, for players (users) to play a game as shown in FIG. 6 without pressing (selecting) the [REVERSE] button 51*f*.

The information processing device 100 of the present embodiment may be provided by respective units according to the following steps.

(Step 1) Input of a Character Image 21

The information processing device 100 related to the present embodiment inputs an image 41 designed (drawn) by a player (user) with an input unit 31.

The input unit 31 stores a character image 21 into RAM of the main memory part 12, which character image 21 is extracted from an input picture provided by an image (picture) scanning device such as a scanner or the like from a predetermined picture area on a sheet (paper, medium or the like) with predetermined coordinates, area and positions having a character designed (drawn).

Further, the information processing device 100 related to the present embodiment may input an image (picture) 41 drawn by using a touch panel as a picture (image data), (Step 2) Generating Battle Parameters 22 (Indicating a Parameter of Character's Fighting Ability)

The Information Processing Device 100 of the present embodiment may generate battle parameters 22 (indicating a parameter of character's fighting ability) to be used in a game, where the battle parameters 22 is generated by the generating unit 32 using the feature value of the character image 21 extracted by the input unit 31.

The generating unit 32 generates the feature value of the character image 21. The generating unit 32 repeatedly extracts data every predetermined number of bits (e.g. eight bits in length) from the character image 21 which data are extracted with the input unit 31. The extracted data are classified into predetermined types of the battle parameters 22 (indicating a parameter of character's fighting ability) according to a predetermined rule. According to a frequency (number) of the predetermined number of bits for individual classified types of the battle parameters 22, the feature value of the character image 21 may be determined (see equation 1).

Further, the generating unit 32 generates a random number using the feature value of the character image 21 as a seed and normalizes the random number (equation 2) for generating the battle parameters 22 (indicating a parameter of the character's fighting ability).

(Step 3-1) Adjusting Display Direction of Character Image (Picture) 21

When the [REVERSE] button 51*f* is not selected, the information processing device 100 determines whether the character image 21 extracted by the input unit 31 should be assigned to the left region of the display area on the display screen 51 according to a predetermined rule, and if necessary the information processing device 100 reverses the character image 21 by the picture reverse unit 34. Then the information processing device 100 of the present embodiment may pass to the display unit 35 the reversed picture 23 of a character image 21.

(Step 3-2) Display of the Display Screen 51

The information processing device 100 of the present embodiment displays the reversed picture 23 received from the picture reverse unit 34 at the left region of the display area on the display screen 51 and the character image 21 extracted by the input unit 31 at the right region of the display area on the display screen 51 by using the display unit 35.

(Step 4) Executing a Game

The information processing device 100 related to the present embodiment executes a game with the executing unit 33 by using the battle parameters 22 (indicating a parameter of the character's fighting ability) of a player (user) generated by the generating unit 32.

The executing unit 33 first determines the first move player (user) to attack using a random number, and then calculates values of actual attack power and an actual defense power by multiplying parameters of "attack power" and "defense power" of the determined first move player's (user's) fighting character and a random number.

Next, the executing unit 33 subtracts numbers of the actual attack power and the actual defense power from a parameter number of "physical strength" parameter of the second move player's (user's) character, and then updates the parameter number of "physical strength" parameter of the second move player's (user's) character.

Further, the executing unit 33 takes turns switching the attack side for the first move player (user) and the defense side for the second move player (user), and continues alternating the attack side and the defense side for each player until one of the player's "physical strength" becomes zero or less than zero, and then the player having zero or less than zero "physical strength" is determined as the loser of the game.

The information processing device 100 of the present embodiment executes an opponent type game by performing individual steps 1 through 4 described above and using the battle parameters 22 (indicating a parameter of character's fighting ability) to be generated, in which the character designed (drawn) by a player (user) is input as a character image 21, and the battle parameters 22 (indicating a parameter of character's fighting ability), such as the attack power and defense power is generated from the feature value of the input character picture.

When opponent character images 21 are displayed into regions of the left side and the right side on the display screen 51, the information processing device 100 of the present embodiment reverses the heading direction of the character image 21 to be displayed in the left region on the display screen 51, so that the display direction of a character being displayed in the left side is adjusted.

After starting the game and during the game, the opponent character images 21 displayed in the left region and the right region on the display screen 51 facing each other remain stationary.

Process of "Game Function"

The information processing device 100 related to the present embodiment described above includes a fundamental process of the information processing "opponent type game function", which will be described using FIG. 7.

Figure 7:
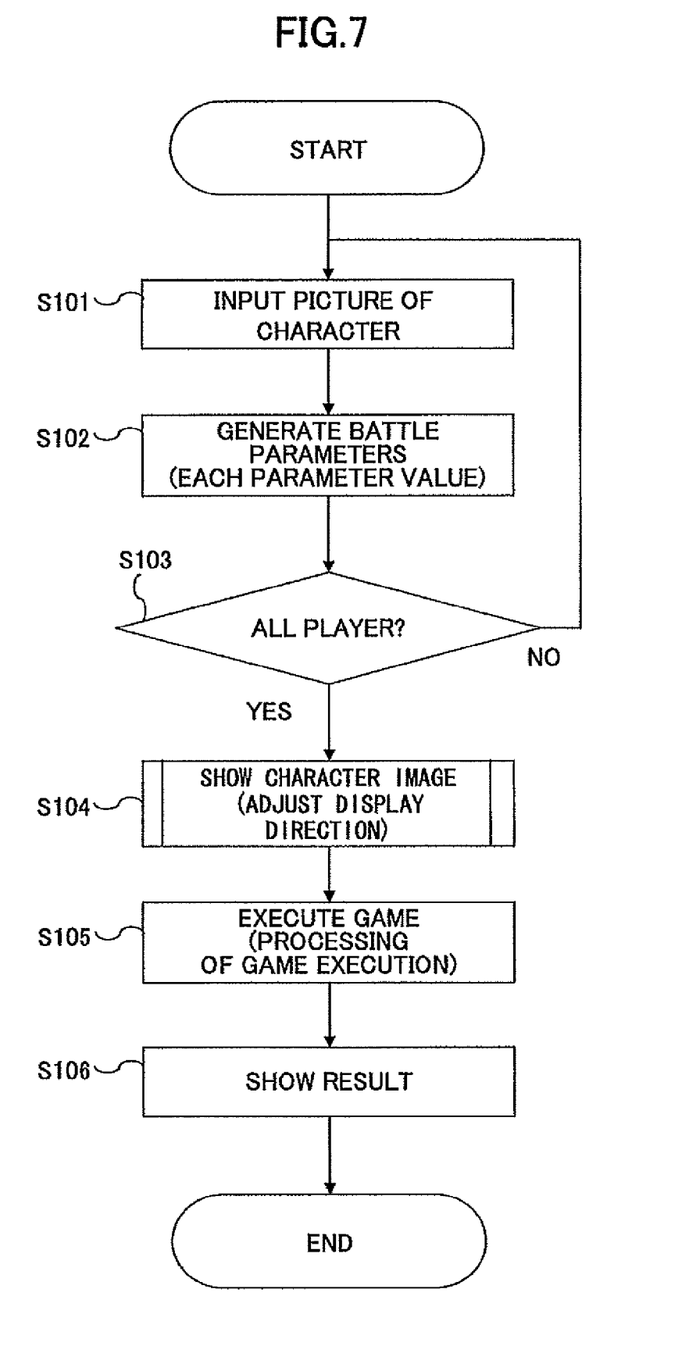
FIG. 7 is a flowchart showing an example of the fundamental process procedure of the information processing related to the first embodiment of the present invention.

FIG. 7 is a flowchart showing an example of a fundamental process of information processing of the first embodiment of the present invention.

For example, the information processing device 100 related to the present embodiment loads an information processing program to perform "opponent type game" into RAM of the main memory part 12, which information processing program is stored in the support memory part 13 of the information processing device 100, and executes with the control part 11. The following processes (S101~S106) are executed.

First, the information processing device 100 related to the present embodiment scans a picture (image) of a character designed (drawn) by a player (user) using a picture reading device such as a scanner or the like via the external device I/F 16 with the input unit 31, and then inputs the character image 21 extracted from a predetermined area of the obtained input picture (S101).

Further, the information processing device 100 of the present embodiment may input an image (picture) 41 drawn with a touch panel.

The information processing device 100 generates the battle parameters 22 (indicating a parameter of character's fighting ability) from the character image 21 input by the generating unit 32 (S102).

The information processing device 100 may check whether the character image 21 has been input (procedure S101) and whether the battle parameters 22 (indicating a parameter of character's fighting ability) has been generated (procedure S102) for all players (users) participating in the game.

If one or more players have not performed the procedures (NO at S103), the character image 21 of the player (user) not having performed is input (S101) and the corresponding battle parameters 22 (indicating a parameter of character's fighting ability) are generated (S102).

If the processes of all players participating the game have been performed (YES at S103), the character image 21 input by the opponent player (user) is displayed on the display screen 51 of the display device such as a CRT and LCD connected via the output device I/F 17 by using the display unit 35. Further the display unit 35 displays GUI parts such as [BATTLE START] button receiving the operating instruction as well as the character image 21 on the display screen 51 (S104).

Next, the information processing device 100 executes (S105) the game using the battle parameters 22 (indicating a parameter of character's fighting ability) of each player (user) when the player (user) presses the [BATTLE START] button of the display screen 51 displayed with the display unit 35.

As a result, the information processing device 100 displays the status of the opponent game or the result of the game on the display device such as a CRT or LCD via the output device I/F 17 (S106).

Thereby, the information device 100 related to the present embodiment may achieve the process, that is, "a character designed (drawn) by a player (user) is input as the character picture 21, and the battle parameters 22 (indicating a parameter of character's fighting ability) such as attack power and defense power used in a game is generated from the feature value of the input image 21, and the game is executed according to the generated battle parameters 22 (indicating a parameter of character's fighting ability)", according to the processes (S101~S106) shown in FIG. 7.

Process of Displaying a Fighting Character in "Opponent Type Game Function"

Figure 8:
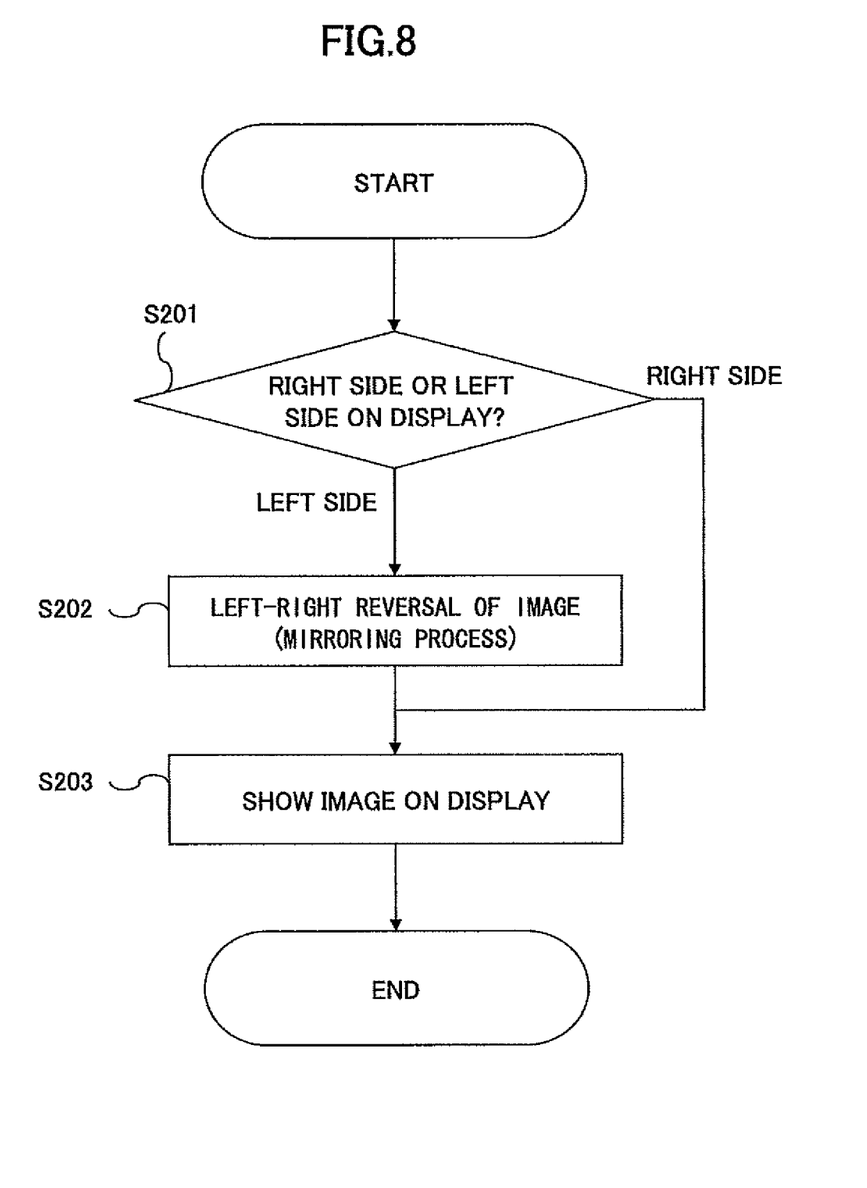
FIG. 8 is a flowchart showing an example of the process procedure of a fighting character display process related to the first embodiment of the present invention.

Next, the process of displaying fighting characters for "opponent type game function" of the information processing device 100 related to the present embodiment (in FIG. 7 (S104)) is described by using FIG. 8.

FIG. 8 is a flowchart showing an example of the process of fighting character display of the first embodiment of the present invention.

The information process device 100 of the present embodiment determines whether the character image 21 extracted by the input unit 31 will be displayed in the left area of the display region on the display screen 51 according to a predetermined rule when the left-right reversal is not instructed with the [REVERSE] button 51*f* by the picture reverse unit 34 (S201).

When the extracted character image 21 is a picture which is not displayed in the left area of the display region on the display screen 51 (NO at S201), the character image 21 is passed to the display unit 35 (S203).

Further, when the extracted character image 21 is displayed in the left area of the display region on the display screen 51 (YES at S201), the character image 21 is processed to reverse (mirroring) the heading direction of the character image 21 by the picture reverse unit 34, and a reversed picture 23 is generated, and then the reversed picture 23 is passed to the display unit 35 (S202).

As a result, the information processing device 100 displays the character image 21 received from the picture reverse unit 34 (including the reversed picture 23 being reversed left-right from the character image 21) on the left region and right area of the display region on the display screen 51 (S203).

Thereby, the information processing device 100 of the present embodiment may achieve the following according to the process (S201~S203) shown in FIG. 8, that is, "when opponent fighting character images 21 are displayed in the left area and right area in the display region on the display screen 51, the character image 21 to be displayed in the left area of the display region on the display screen 51 has its heading left-to-right reversed, so that the display direction of the character to be displayed in the left area is adjusted."

As described above, according to the first embodiment of the present invention, the information processing device 100 of the embodiment may perform an "opponent type game function" by the following process.

(Step 1) Input a Character Image 21

The information processing device 100 related to the present embodiment may input a picture (image data) 41 designed (drawn) by a player (user) as a picture by the input unit 31.

The input unit 31 may store a character image 21 into RAM of a main memory part 12, which character image 21 is extracted from an input picture provided by a picture reading device such as a scanner or the like from a predetermined picture area on a sheet (paper, medium or the like) with predetermined coordinates, area and positions having a character designed (drawn).

Further, the information processing device 100 of the present embodiment may input an image (drawing) 41 drawn by using a touch panel as a picture (image).

(Step 2) Generating Battle Parameters 22 (Indicating a Parameter of Character's Fighting Ability)

The information processing device 100 of the present embodiment may generate battle parameters 22 (indicating a parameter of character's fighting ability) to be used in a game, where the battle parameters 22 are generated by the generating unit 32 using the feature value of the character image 21 extracted by the input unit 31.

The generating unit 32 generates the feature value of the character image 21. The generating unit 32 repeatedly extracts data by every predetermined number of bits (e.g. eight bits in length) from the character image 21 which is extracted with the input unit 31. The extracted data are classified into predetermined types of the battle parameters 22 (indicating a parameter of character's fighting ability) according to a predetermined rule. According to a frequency (number) of the predetermined number of bits for individual classified types of the battle parameters 22, the feature value of the character image 21 may be determined (see equation 1).

Further, the generating unit 32 generates a random number using the feature value of the character image 21 as a seed and normalizes the random number (equation 2) for generating the battle parameters 22 (indicating a parameter of the character's fighting ability).

(Step 3-1) Adjusting Display Direction of Character Image 21

The information processing device 100 of the present embodiment may pass to the display unit 35 the reverse picture 23 of a character image 21. When the [REVERSE] button 51f is not operated by the picture reverse unit 34, the information processing device 100 determines whether the character image 21 extracted by the input unit 31 should be assigned to the left region of the display area on the display screen 51 according to a predetermined rule, if necessary the information processing device 100 reverses the character image 21.

(Step 3-2) Display of the Display Screen 51

The information processing device 100 related to the present embodiment displays the reversed picture 23 received from the picture reverse unit 34 at the left region of the display area on the display screen 51 and the character image 21 extracted by the input unit 31 at the right region of the display area on the display screen 51 by using the display unit 35.

(Step 4) Executing a Game

The information processing device 100 of the present embodiment executes a game with the executing unit 33 by using the battle parameters 22 (indicating a parameter of the character's fighting ability) of a player (user) generated by the generating unit 32.

The executing unit 33 first determines the first move player (user) to attack using a random number, and then calculates values of actual attack power and actual defense power by multiplying parameters of "attack power" and "defense power" of the determined first move player's (user's) fighting character and a random number.

Next, the executing unit 33 subtracts numbers of the actual attack power and the actual defense power from a parameter number of "physical strength" parameter of the second move player's (user's) character, and then updates the parameter number of "physical strength" parameter of the second move player's (user's) character.

Further, the executing unit 33 takes turns switching the attack side for the first move player (user) and the defense side for the second move player (user), and continues until one of the player's "physical strength" becomes zero or less than zero then the player having zero or less than zero of "physical strength" is determined as the loser of the game.

Thereby, the information processing device 100 performs step 1 through step 4 as describe above, and when the information processing device 100 displays character images 21 designed and input by the players (users) into the left area and right area of the display region on the display screen 51, the character image 21 displayed in the left area of the display region on the display screen 51 has its heading reversed left to right, so that the display direction of the character to be displayed in the left area is adjusted. Then the information processing device 100 of the present embodiment provides an information processing device, an information processing method and information processing means, enabling reducing the likelihood of displaying an opponent character in an inappropriate direction.

Thereby, the information processing device 100 related to the present embodiment may provide a player (user) for playing an opponent type game without an uncomfortable feeling caused by an inappropriate display direction of a character.

So far, though the present invention is described based on the first embodiment, where an "opponent type game function" is executed in the information processing device 100, the first embodiment of the present invention may be achieved by executing the individual steps described in FIG. 7 and FIG. 8 of the first embodiment by coding with program languages suitable for respective different operating environments (platforms) with the control part 11. Thereby, the program (information program) executing "opponent type game function", included in the information processing device 100 of the first embodiment of the present invention, may be stored in a storage medium that is readable by a computer (system). Further, such a program may be received through a network and stored into a nonvolatile storage device such as the support memory part 13.

The present invention is not limited to the picture (picture forming medium) 41, being used so that "a player (user) designs (draws) a character", described as a "paper" in the embodiment for the information processing device 100 of the first embodiment of the present invention.

The picture forming medium 41 may be paper, electrical paper, rewritable paper, or a device which provides that "a human being reads and writes" and "the written information may be readable (able to input)." For example, when a display device having a touch panel function is connected to the information processing device 100 of the first embodiment via the output device I/F 17, a user may input a picture drawn on the touch panel with a touch pen or the like into the information processing device 100.

Further, the present invention is not limited to the situation where "plural players (users) may play a game with the same information processing device 100", described in the information processing device 100 of the first embodiment of the present invention.

The information processing device 100 of the first embodiment includes a network I/F 14. For example, one information processing device 100 is connected to another information processing device 100 via a network connectable to the network I/F 14, so that it is possible to perform an opponent game via the network.

Further, the present invention is not limited to the situation where "parameters of battle parameters 22" may be "physical strength", "attack power", and "defense power", described in the information processing device 100 of the first embodiment of the present invention.

Further, the present invention is not limited to the shape of an extracting region described in the embodiment although "picture extraction of the input unit 31" is described as "a predetermined rectangular region of a picture is extracted in the regions 41a and 41b in FIG. 3", for the information processing device 100 of the first embodiment of the present invention.

Further, a "regional cutting technique" in a related art case may be used as a way of extracting part of a picture from a predetermined region. For a calculation method of a degree of similarity based on a standard screen, "a picture similarity calculation technique" in a related art case may be used.

Finally, for another combination of elements for shapes described in the embodiment above, the present invention is not limited to the requirements described herein. With regard to these issues, it is possible to include modifications within the scope of the present invention and as properly determined according to the applied embodiments.

The present invention is not limited to the specifically disclosed embodiments, and variations and modifications may be made without departing from the scope of the present invention.

The present application is based on Japanese priority application No. 2007-161786 filed Jun. 19, 2007, the entire contents of which are hereby incorporated herein by reference.

What is claimed is:

1. An information processing device comprising:
a storage unit configured to store a program; and
a processor configured to execute the program,
wherein the program which, when executed by the processor, functions as:
an input unit configured to input an image of a drawing obtained from a medium which can be drawn by at least one user, the image of the drawing being drawn by the at least one user;
an image reverse unit configured to reverse left and right facing directions of the image of the drawing; and
a display unit configured to display a display screen, the display screen including a left side and a right side each displaying one of two different images of two different drawings input by the input unit,
wherein the display unit is configured to display one of the two images reversed by the image reverse unit on the left side of the display screen and to display the other one of the two images not reversed by the image reverse unit on the right side of the display screen,
wherein the image reverse unit, without user intervention, reverses the one of the two images before the one of the two images is displayed on the left side of the display screen.

2. An information processing method conducted in an information processing device, the information processing method comprising:
an input step of inputting, by an application executed by a processor of the information processing device, an image of a drawing obtained from a medium which can be drawn by at least one user, the image of the drawing being drawn by the at least one user;
an image reverse step of reversing left and right facing directions of the image of the drawing; and
a display step of displaying a display screen, the display screen including a left side and a right side each displaying one of two different images of two different drawings input by the input step,
wherein the display step displays one of the two images reversed by the image reverse step on the left side of the display screen and displays the other one of the two images not reversed by the image reverse step on the right side of the display screen,
wherein the image reverse step, without user intervention, reverses the one of the two images before the one of the two images is displayed on the left side of the display screen.

3. A non-transitory computer-readable storage medium that stores a program which, when executed by a computer, causes the computer to perform a process comprising:
an input step of inputting an image of a drawing obtained from a medium which can be drawn by at least one user, the image of the drawing being drawn by the at least one user;
an image reverse step of reversing left and right facing directions of the image of the drawing; and
a display step of displaying a display screen, the display screen including a left side and a right side each displaying one of two different images of two different drawings input by the input step,
wherein the display step displays one of the two images reversed by the image reverse step on the left side of the display screen and displays the other one of the two images not reversed by the image reverse step on the right side of the display screen, wherein the image reverse step, without user intervention, reverses the one of the two images before the one of the two images is displayed on the left side of the display screen.

4. The information processing device according to claim 1, further comprising:
   a determining unit configured to determine which side the image is displayed;
   wherein
   the display unit is configured to display the one of the two images reversed by the image reverse unit on the left side of the display screen and the other one of the two images not reversed by the image reverse unit on the right side of the display screen automatically based on the determining by the determining unit.

5. The information processing device according to claim 1, further comprising:
   a generation unit configured to generate a parameter set to the image of the drawing based on a feature value obtained from the image of the drawing; and
   a performing unit configured to perform processing to the image of the drawing displayed on the display screen based on the parameter generated by the generation unit.

6. The information processing device according to claim 5, wherein
   the generation unit is configured to generate a plurality of parameters, the generation of each parameter being based on a random number generated with respect to a feature value corresponding to each of the parameters.

7. The information processing device according to claim 5, wherein
   the performing unit is configured to perform a game by performing processing to each of the two images of the two drawings displayed on the display screen based on the parameter of each image.

8. The information processing device according to claim 1, wherein
   the medium is at least one of paper, electronic paper, rewritable paper, an electric tablet, and a touch panel.

* * * * *